United States Patent
Wang (10) Patent No.: US 9,164,348 B2
(45) Date of Patent: Oct. 20, 2015

(54) LIGHT GUIDE AND ELECTROPHORETIC DISPLAY APPARATUS SWITCHABLE BETWEEN BLACK-WHITE MODE AND COLOR MODE

(71) Applicant: E Ink Holdings Inc., Hsinchu (TW)

(72) Inventor: Shih-Yu Wang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 191 days.

(21) Appl. No.: 13/846,842

(22) Filed: Mar. 18, 2013

(65) Prior Publication Data
US 2013/0314763 A1  Nov. 28, 2013

Related U.S. Application Data

(60) Provisional application No. 61/652,244, filed on May 28, 2012.

(30) Foreign Application Priority Data

Nov. 15, 2012  (TW) .............................. 101142614 A (51) Int. Cl.
```
G02B 26/00      (2006.01)
G02F 1/167      (2006.01)
F21V 8/00       (2006.01)
```

(52) U.S. Cl.
CPC .............. *G02F 1/167* (2013.01); *G02B 6/0011* (2013.01); *G02B 6/0038* (2013.01);
(Continued)

(58) Field of Classification Search
CPC .............. G02F 1/133514; G02F 1/167; G02F 1/133512; G02F 1/1339; G02F 1/134309; G02F 1/13306; G02F 1/133345; G02F 1/1368; G02F 1/13338; G02F 1/136286; G02F 1/163; G02F 1/0102; G02F 1/13439; G02F 1/01; G02F 1/1334; G02F 1/13352

USPC ......... 359/296, 241, 237–238, 247, 265–270, 359/290–291, 301, 303–304, 321, 245, 359/253–254, 298; 349/71, 33, 106; 313/417–469; 362/84, 231, 555, 583, 362/284, 322, 324; 345/45, 105, 107; 430/31–32

See application file for complete search history.

(56) References Cited

U.S. PATENT DOCUMENTS

| | | | |
|---|---|---|---|
| 5,703,667 A | * | 12/1997 | Ochiai .............................. 349/65 |
| 6,151,169 A | * | 11/2000 | Kim .............................. 359/640 |
| 2011/0141395 A1 | * | 6/2011 | Yashiro ............................ 349/62 |

FOREIGN PATENT DOCUMENTS

| CN | 1605913 A | 4/2005 |
|---|---|---|
| CN | 1607435 A | 4/2005 |

(Continued)

OTHER PUBLICATIONS

Corresponding TW Office Action that these art references were cited.
(Continued)

*Primary Examiner* — Thomas K Pham
*Assistant Examiner* — Sharrief Broome
(74) *Attorney, Agent, or Firm* — CKC & Partners Co., Ltd.

(57) ABSTRACT

Disclosed herein is a light guide, which includes a light-receiving surface and a light-emitting surface. The light-emitting surface includes a plurality of gratings spaced apart from each other by a spacing interval. Each grating has a number of prisms extending in a predetermined direction. The predetermined direction of at least one grating is different from that of another grating. These gratings cooperate together to allow light in a wavelength range to transmit the gratings, and to restrict light in another wavelength range to transmit the gratings. An electrophoretic display apparatus switchable between black-white mode and color mode is disclosed as well.

18 Claims, 7 Drawing Sheets

(52) U.S. Cl.
CPC ........ *G02B 6/0058* (2013.01); *G02F 2201/305* (2013.01); *G02F 2201/52* (2013.01); *G02F 2203/055* (2013.01); *G02F 2203/34* (2013.01)

(56) References Cited

FOREIGN PATENT DOCUMENTS

| CN | 1797107 A | 7/2006 |
|---|---|---|
| CN | 101017218 A | 8/2007 |
| CN | 101435893 A | 5/2009 |
| CN | 101743433 A | 6/2010 |
| TW | 200739151 | 10/2007 |

OTHER PUBLICATIONS

Corresponding Chinese Office Action that these art references were cited.

Corresponding Chinese Office Action that the art reference was cited on Apr. 22, 2015.

* cited by examiner

LIGHT GUIDE AND ELECTROPHORETIC DISPLAY APPARATUS SWITCHABLE BETWEEN BLACK-WHITE MODE AND COLOR MODE

CROSS REFERENCE TO RELATED APPLICATIONS

This application claims priority to U.S. Provisional Application Ser. No. 61/652,244 filed May 28, 2012, and Taiwan Application Serial Number 101142614, filed Nov. 15, 2012, the disclosures of which are incorporated herein by reference in their entireties.

BACKGROUND

1. Technical Field

The present invention relates to a light guide and an electrophoretic display apparatus switchable between a black-white mode and a color mode.

2. Description of Related Art

Conventional electrophoretic display devices exhibit black-white images and can not provide colorful images. For the purpose of providing colorful images, many researches attempt to add color filters in conventional electrophoretic display devices. However, the pigment or dye in the color filters adsorbs about two-third of incident light so that the brightness of the electrophoretic display devices is significantly decreased. In addition, this kind of electrophoretic display devices exhibits color images only, and can not be switchable between a black-white mode and a color mode. Therefore, there exists in this art a need for a new electrophoretic display apparatus which is capable of resolving these issues.

SUMMARY

According to one aspect of the present disclosure, a light guide is provided. The light guide includes a light-receiving surface and a light-emitting surface. The light-receiving surface is configured to receive an incident light. The light-emitting surface includes a first region having a plurality of gratings spaced apart from each other by a spacing interval. Each of the gratings has a respective pre-determined direction and includes a plurality of prisms extending in the respective pre-determined direction. A pre-determined direction of at least one of the gratings of the first region is different from a pre-determined direction of another one of the gratings of the first region. The gratings of the first region cooperate together to transmit a light having a wavelength in a first wavelength range, and to block a light having a wavelength in another wavelength range.

According to one embodiment of the present disclosure, the gratings include a first grating and a second grating. The first grating has a plurality of prisms extending in a first direction. The second grating has a plurality of prisms extending in a second direction that is substantially perpendicular to the first direction.

According to one embodiment of the present disclosure, the gratings further include a third grating and a fourth grating. The third grating has a plurality of prisms extending in a third direction. The fourth grating has a plurality of prisms extending in a fourth direction. An included angle between the third direction and the first direction is about 25 degrees to about 35 degrees. An included angle between the fourth direction and the first direction is about 55 degrees to about 65 degrees.

According to one embodiment of the present disclosure, the gratings further include a fifth grating and a sixth grating. The fifth grating has a plurality of prisms extending in a fifth direction. The sixth grating has a plurality of prisms extending in a sixth direction. An included angle between the fifth direction and the first direction is about 115 degrees to about 125 degrees. An included angle between the sixth direction and the first direction is about 145 degrees to about 155 degrees.

According to one embodiment of the present disclosure, the first grating, the second grating and the third grating are substantially disposed in a row, whereas the fourth grating, the fifth grating and the sixth grating are substantially disposed in another row.

According to one embodiment of the present disclosure, an edge of the fourth grating is substantially aligned with an edge of the second grating, and an edge of the fifth grating is substantially aligned with an edge of the third grating.

According to one embodiment of the present disclosure, the prisms of the first grating are arranged by a first pitch, the prisms of the second grating are arranged by a second pitch, and the prisms of the third grating are arranged by a third pitch. The first pitch substantially equals the third pitch, and the first pitch is greater than the second pitch.

According to one embodiment of the present disclosure, all of the gratings are of substantially equal area.

According to one embodiment of the present disclosure, the spacing interval is about 1 μm to about 15 μm.

According to one embodiment of the present disclosure, the prisms are tinged by a pitch of about 0.2 μm to about 22.3 μm.

According to one embodiment of the present disclosure, the first wavelength range includes at least one wavelength between about 600 nm and about 680 nm, whereas said another wavelength range includes at least one wavelength between about 500 nm and about 570 nm and at least one wavelength between about 400 nm and about 490 nm.

According to one embodiment of the present disclosure, the first wavelength range includes at least one wavelength between about 500 nm and about 570 nm, whereas said another wavelength range includes at least one wavelength between about 600 nm and about 680 nm and at least one wavelength between about 400 nm and about 490 nm.

According to one embodiment of the present disclosure, the first wavelength range includes at least one wavelength between about 400 nm and about 490 nm, whereas said another wavelength range includes at least one wavelength between about 600 nm and about 680 nm and at least one wavelength between about 500 nm and about 570 nm.

According to one embodiment of the present disclosure, the light-emitting surface further includes a second region having a plurality of gratings spaced apart from each other by a spacing interval. Each of the gratings of the second region has a respective pre-determined direction and includes a plurality of prisms extending in the respective pre-determined direction of the gratings of the second region. A pre-determined direction of at least one of the gratings of the second region is different from a pre-determined direction of another one of the gratings of the second region. The gratings of the second region cooperate together to transmit a light having a wavelength in a second wavelength range, and to block a light having a wavelength in another wavelength range.

According to one embodiment of the present disclosure, the light-emitting surface further comprises a third region having a plurality of gratings spaced apart from each other by a spacing interval. Each of the gratings of the third region has a respective pre-determined direction and includes a plurality of prisms extending in the respective pre-determined direction of the gratings of the third region. A pre-determined direction of at least one of the gratings of the third region is different from a pre-determined direction of another one of the gratings of the third region. The gratings of the third region cooperate together to transmit a light having a wavelength in a third wavelength range, and to block a light having a wavelength in another wavelength range.

According to one aspect of the present disclosure, an electrophoretic display apparatus, which is switchable between a black-white mode and a color mode, is provided. The electrophoretic display apparatus includes an electrophoretic display panel, a light source and a light guide. The electrophoretic display panel has a first sub-pixel, a second sub-pixel and a third sub-pixel. The light source is for emitting a light. The light guide includes a light-receiving surface and a light-emitting surface. The light-receiving surface is for receiving the light emitted from the light source. The light-emitting surface includes a first region, a second region and a third region. The first region has a plurality of gratings spaced apart from each other by a spacing interval, in which the gratings of the first region cooperate together to transmit light having a wavelength in a first wavelength range, and to block light having a wavelength in another wavelength range. The second region has a plurality of gratings spaced apart from each other by a spacing interval, in which the gratings of the second region cooperate together to transmit light having a wavelength in a second wavelength range, and to block light having a wavelength in another wavelength range. The third region has a plurality of gratings spaced apart from each other by a spacing interval, in which the gratings of the third region cooperate together to transmit light having a wavelength in a third wavelength range, and to block light having a wavelength in another wavelength range. When the light source is turned on, the first, second and third regions respectively direct the light of the first, second and third wavelength ranges to the first, second and third sub-pixels such that the electrophoretic display apparatus is operated in the color mode. When the light source is turned off, the electrophoretic display apparatus is operated in the black-white mode.

According to one embodiment of the present disclosure, each of the gratings of the first region has a respective pre-determined direction and includes a plurality of prisms extending in the respective pre-determined direction. A pre-determined direction of at least one of the gratings of the first region is different from a pre-determined direction of another one of the gratings of the first region.

According to one embodiment of the present disclosure, each of the gratings of the second region has a respective pre-determined direction and includes a plurality of prisms extending in the respective pre-determined direction. A pre-determined direction of at least one of the gratings of the second region is different from a pre-determined direction of another one of the gratings of the second region.

According to one embodiment of the present disclosure, each of the gratings of the third region has a respective pre-determined direction and includes a plurality of prisms extending in the respective pre-determined direction. A pre-determined direction of at least one of the gratings of the third region is different from a pre-determined direction of another one of the gratings of the third region.

According to one embodiment of the present disclosure, the first wavelength range includes at least one wavelength between about 600 nm and about 680 nm, the second wavelength range includes at least one wavelength between about 500 nm and about 570 nm, and the third wavelength range includes at least one wavelength between about 400 nm and about 490 nm.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
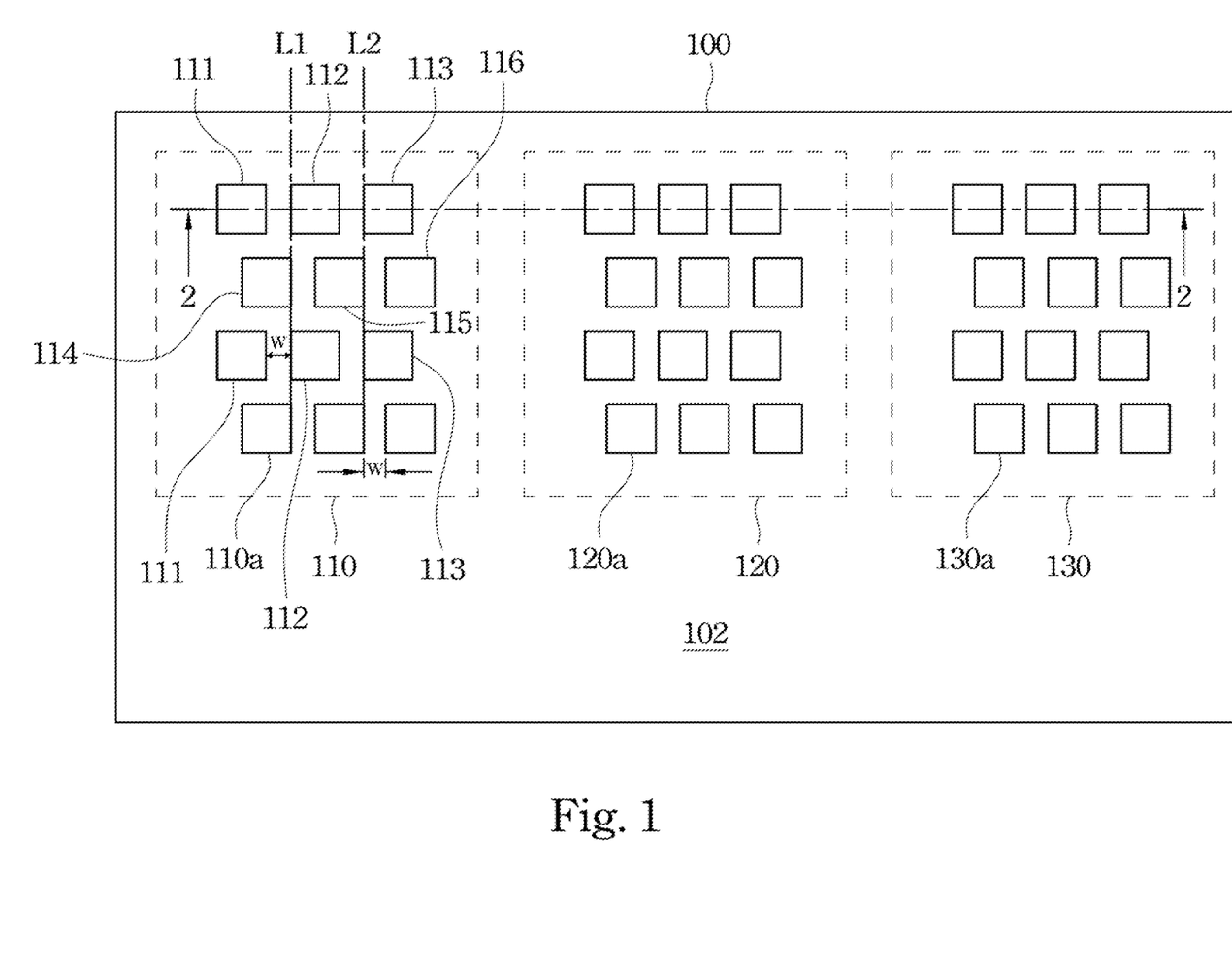
FIG. 1 is a top view schematically illustrating a light guide according to one embodiment of the present disclosure.
Figure 2:
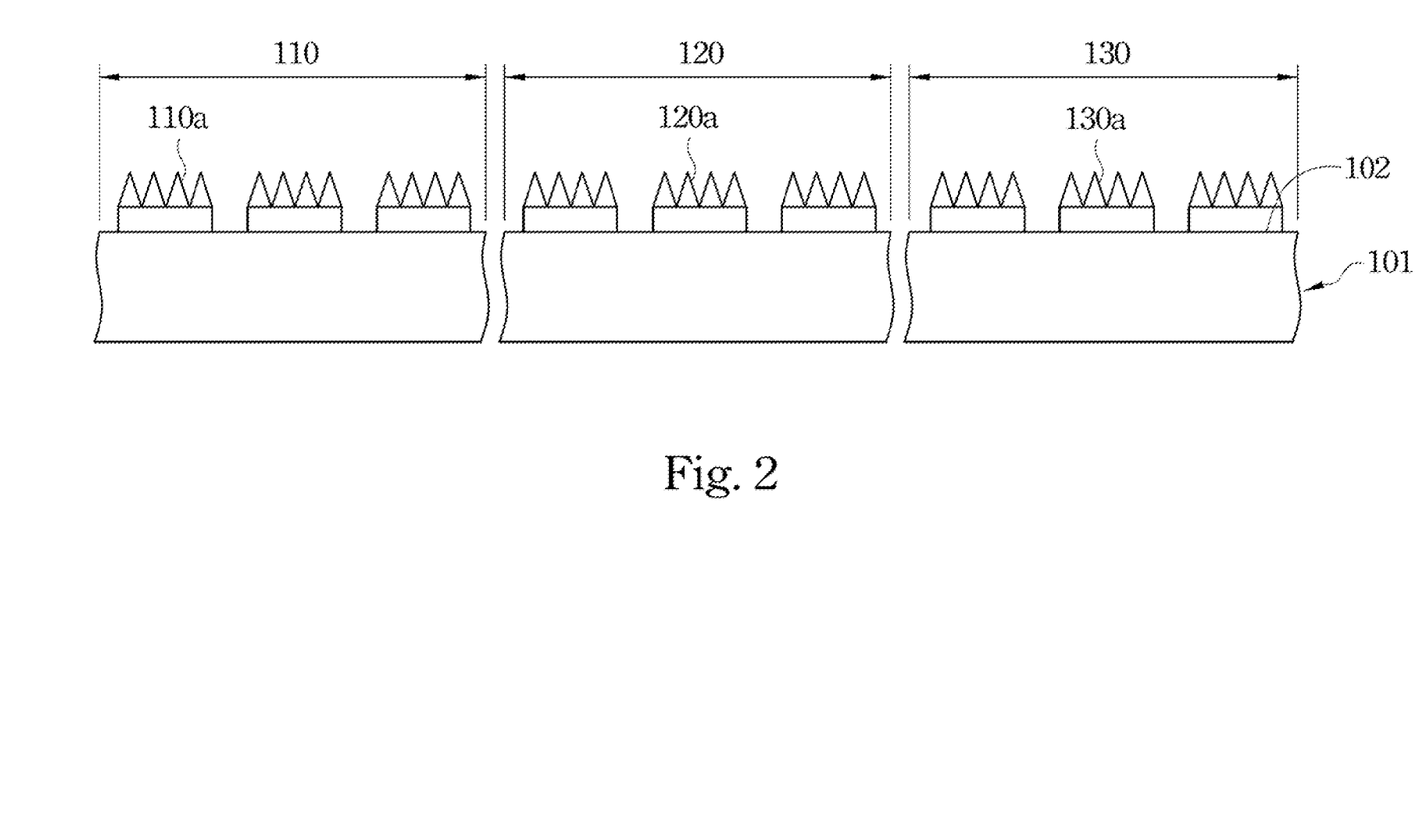
FIG. 2 is a cross-sectional view along line 2-2' in FIG. 1.

According to one aspect of the present disclosure, a light guide is provided. FIG. 1 is a top view schematically illustrating a light guide 100 according to one embodiment of the present disclosure. FIG. 2 is a cross-sectional view along line 2-2' in FIG. 1. The light guide 100 includes a light-receiving surface 101 and a light-emitting surface 102. The light-receiving surface 101 is configured to receive an incident light. The incident light may pass through the light-receiving surface 101 and be transmitted in the light guide 100, and then exits the light guide 100 through the light-emitting surface 102. The light guide 100 may be made of visible-light transmissible material such as polymethyl methacrylate (PMMA).

With reference to FIG. 1 and FIG. 2, the light-emitting surface 102 of the light guide 100 includes a first region 110, which includes a plurality of gratings 110a. The gratings 110a of the first region 110 cooperate together to transmit light having a wavelength in a first wavelength range, and to block light having a wavelength in another wavelength range. Therefore, when light is transmitted through the light-receiving surface 101 into the light guide 100, the first region 110 may exhibit a color such as a red color, a green color or a blue color. The aforementioned "to block light having a wavelength in another wavelength range" may be comprehended as a variation in transmittance upon the wavelength of the light, in which the transmittance of the gratings to the light of said another wavelength range is significantly smaller than the transmittance to the light of the first wavelength range such that the gratings exhibit a non-white color. For instance, the transmittance of the gratings to the light having a wavelength within the first wavelength range may be greater than 60%. On the other hand, the transmittance of the gratings to the light having a wavelength within said another wavelength range mat be less than 30%. More specifically, the grating 110a may reflect the light within said another wavelength range. In one embodiment, the first wavelength range includes at least one wavelength between about 600 nm and about 680 nm, whereas said another wavelength range includes at least one wavelength between about 500 nm and about 570 nm and at least one wavelength between about 400 nm and about 490 nm. In another embodiment, the first wavelength range includes at least one wavelength between about 500 nm and about 570 nm, whereas said another wavelength range includes at least one wavelength between about 600 nm and about 680 nm and at least one wavelength between about 400 nm and about 490 nm. In still another embodiment, the first wavelength range includes at least one wavelength between about 400 nm and about 490 nm, whereas said another wavelength range includes at least one wavelength between about 600 nm and about 680 nm and at least one wavelength between about 500 nm and about 570 nm. In one example, the gratings 110a may be made of a material with a refractive index of about 1.5 to about 1.65. In other examples, the gratings 110a may be diffraction gratings.

The gratings 110a of the first region 110 are spaced apart from each other by a spacing interval w. In other words, any two adjacent gratings 110a are not in contact with each other and are not physically connected. Each of the gratings 110a of the first region 110 has a respective pre-determined direction and includes a plurality of prisms extending in respective pre-determined direction. A pre-determined direction of at least one of the gratings 110a of the first region 110 is different from a pre-determined direction of another one of the gratings 110a of the first region 110, which is described in detail hereinafter.

Figure 3A:
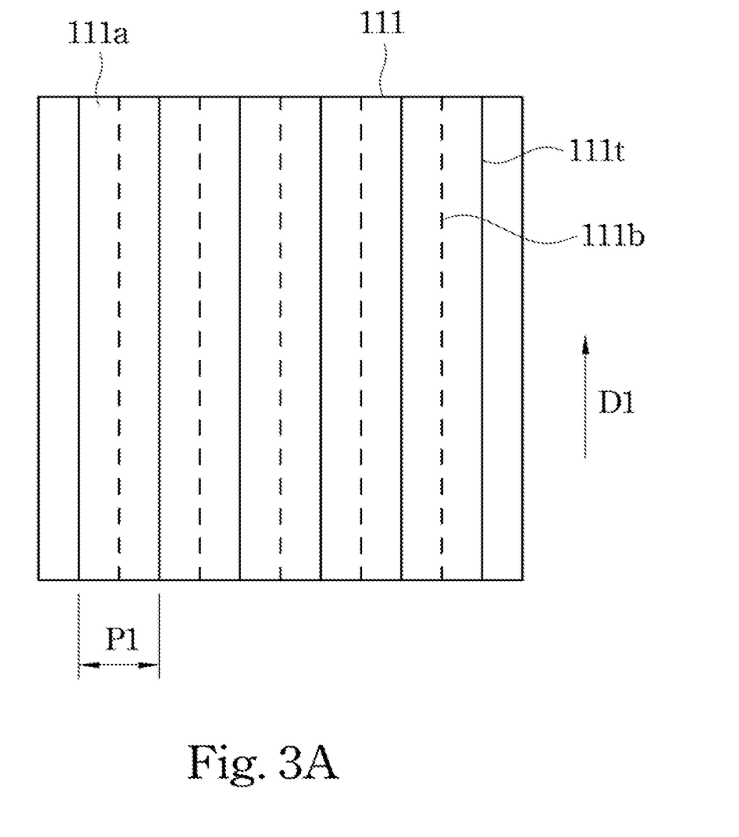
FIG. 3A is a top view schematically illustrating a first grating according to one embodiment of the present disclosure.
Figure 3B:
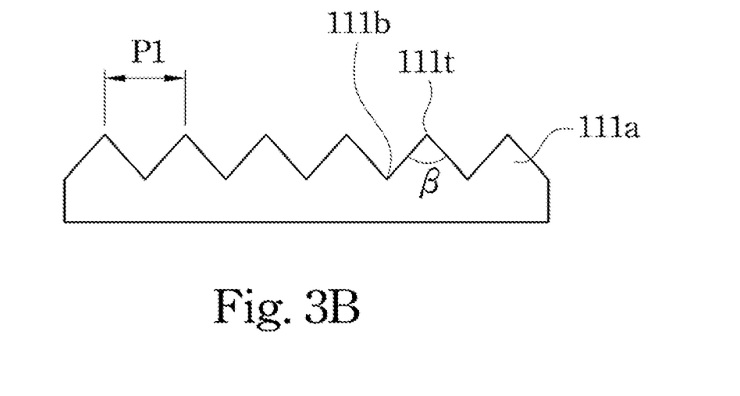
FIG. 3B depicts a cross-sectional view of the first grating in FIG. 3A.
Figure 3C:
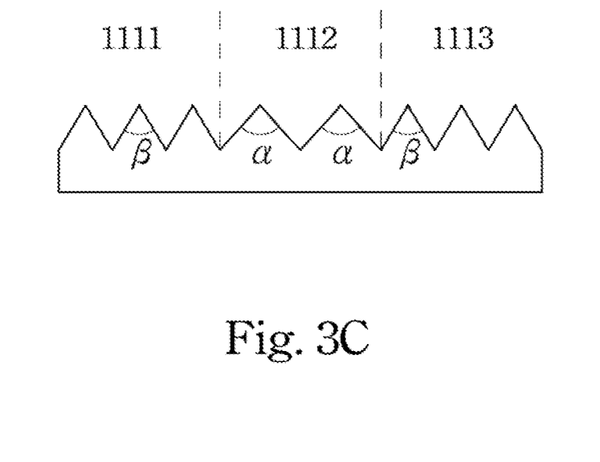
FIG. 3C depicts a cross-sectional view of a first grating according to another embodiment of the present disclosure.

As depicted in FIG. 1, the gratings 110a of the first region 110 at least include a first grating 111 and a second grating 112. FIG. 3A is a top view schematically illustrating the first grating 111, and FIG. 3B depicts a cross-sectional view of the first grating 111. The first grating 111 has a plurality of prisms 111a that extend in a first direction D1. The crest line 111t of each of the prisms 111a is parallel with the first direction D1, and the prisms 111a are regularly arranged by a first pitch P1. A concave groove 111b is formed between two adjacent prisms 111a. In one embodiment, the first pitch P1 is about 0.2 μm to about 22.3 μm for the purpose of allowing the gratings 110a of the first region 110 to cooperate together to transmit light within the first wavelength range, and to block light within another wavelength range. When the first pitch P1 exceeds the range of about 0.2 μm to about 22.3 μm, the first region 110 unlikely become transmissible to trichromatic light, and unlikely exhibits a trichromatic color such as a red color, a green color and a blue color. Furthermore, the top portion of each of the prisms 111a has a crest angle β of about 80 degrees to about 125 degrees, for example. The aforementioned range of the crest angle β is designed to make the first region 110 transmits red light, green light or blue light. In other embodiments, the first grating 111 may have two or more different pitches and crest angles, as depicted in FIG. 30. The first grating 111 includes a first portion 1111, a second portion 1112 and a third portion 1113. Each of the crest angles β of the prisms of the first portion 1111 is equal to each of the crest angles β of the prisms of the third portion 1113, and the prisms of the first portion 1111 and the prisms of the third portion 1113 are arranged by an identical pitch. The second portion 1112 is positioned between the first portion 1111 and the third portion 1113. Each of the crest angles α of the prisms of the second portion 1112 is greater than each of the crest angles β of both the first portion 1111 and the third portion 1113. For instance, the crest angles α may be about 115 degrees to about 125 degrees, and the crest angles β may be about 85 degrees to about 95 degrees. In one example, the prisms 111a may be made of a material with a refractive index of about 1.5 to about 1.65.

Figure 4:
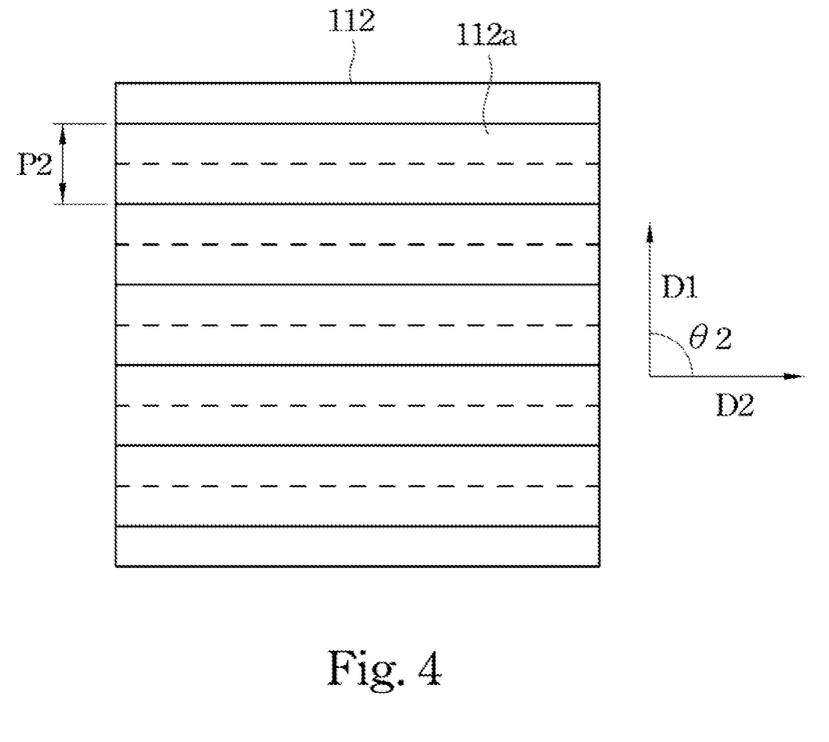
FIG. 4 is a top view schematically illustrating the second grating according to one embodiment of the present disclosure.

FIG. 4 is a top view schematically illustrating the second grating 112 according to one embodiment of the present disclosure. The second grating 112 has a plurality of prisms 112a that extend in a second direction D2. The second direction D2 is substantially perpendicular to the first direction D1. In other words, the included angle θ2 between the second direction D2 and the first direction D1 is about 90 degrees. The pitch and the crest angle of the prisms 112a of the second grating 112 may be the same as or different from that of the prisms 111a of the first grating 111. With reference to FIG. 1, the second grating 112 is spaced apart from the first grating 111 by the spacing interval w. The spacing interval w may be in the range of about 1 μm to about 15 μm, for example. The aforementioned range of the spacing interval w is critical and is obtained from a number experiments. When the spacing interval w is less than about 1 μm, the two gratings 111, 112 interfere with each other, and is unfavorable to the cooperation there between. On the other hand, when the spacing interval w is greater than about 15 μm, the spacing interval w between the gratings 111, 112 is too large and therefore all visible light with any wavelength may pass through the region of the spacing interval such that the region of the spacing interval exhibits a white color. Significantly, when the spacing interval w exceeds the range of about 1 μm to about 15 μm, the gratings 110a unlikely cooperate together to transmit light in certain wavelength range and to block light in another wavelength range.

Figure 5:
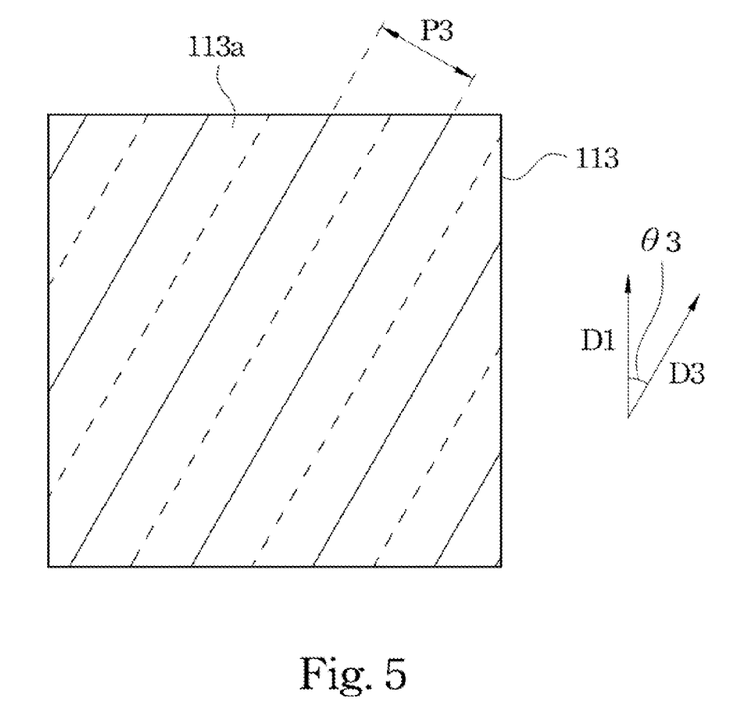
FIG. 5 is top view schematically illustrating a third grating according to one embodiment of the present disclosure.
Figure 6:
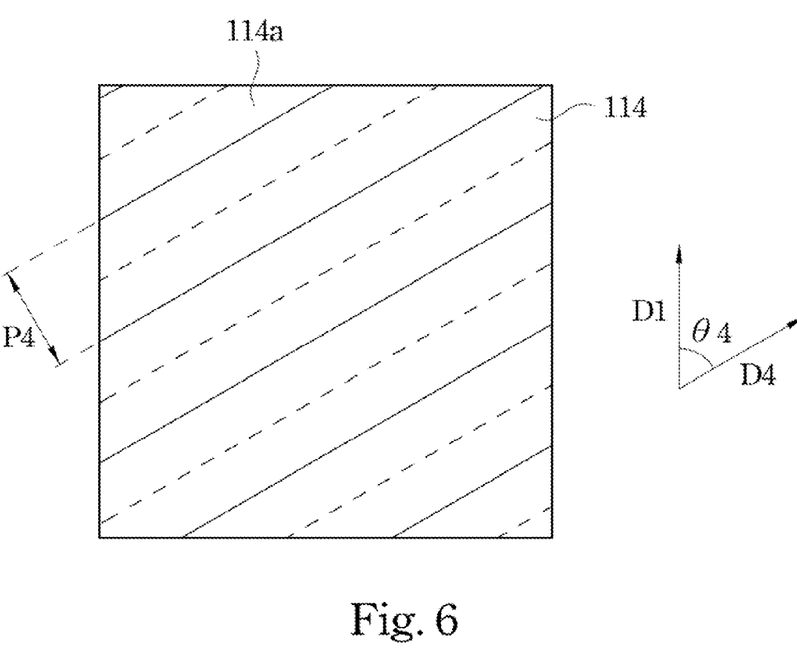
FIG. 6 is top view schematically illustrating a fourth grating according to one embodiment of the present disclosure.

In one embodiment, the first region 110 further includes a third grating 113 and a fourth grating 114. FIG. 5 and FIG. 6 are top views respectively illustrating the third grating 113 and the fourth grating 114. The third grating 113 has a plurality of prisms 113a extending in a third direction D3. The fourth grating 114 has a plurality of prisms 114a extending in a fourth direction D4. The included angle θ3 between the third direction D3 and the first direction D1 is about 25 degrees to about 35 degrees. The included angle θ4 between the fourth direction D4 and the first direction D1 is about 55 degrees to about 65 degrees. The prisms 113a of the third grating 113 are arranged by a third pitch P3. The prisms 114a of the fourth grating 114 are arranged by a fourth pitch P4. In one example, the third pitch P3 substantially equals the first pitch P1 of the first grating 111, but the first pitch P1 is greater than the second pitch P2 of the second grating 112. The fourth pitch P4 substantially equals the second pitch P2. In other examples, the first pitch P1, the second pitch P2, the third pitch P3 and the fourth pitch P4 are of substantially equal length. Each of the first pitch P1, the second pitch P2, the third pitch P3 and the fourth pitch P4 is in the range of about 0.2 μm to about 22.3 μm.

Figure 7:
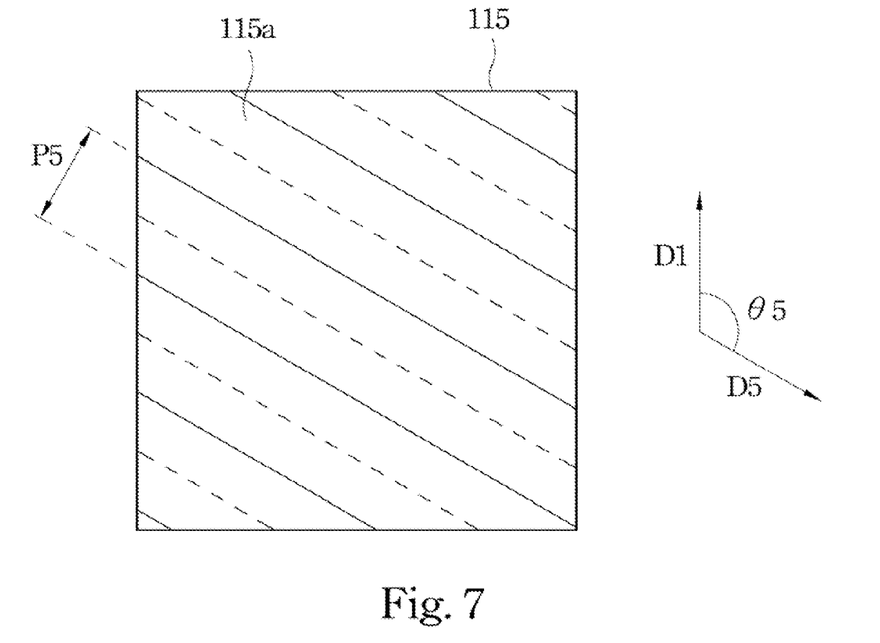
FIG. 7 is top view schematically illustrating a fifth grating according to one embodiment of the present disclosure.
Figure 8:
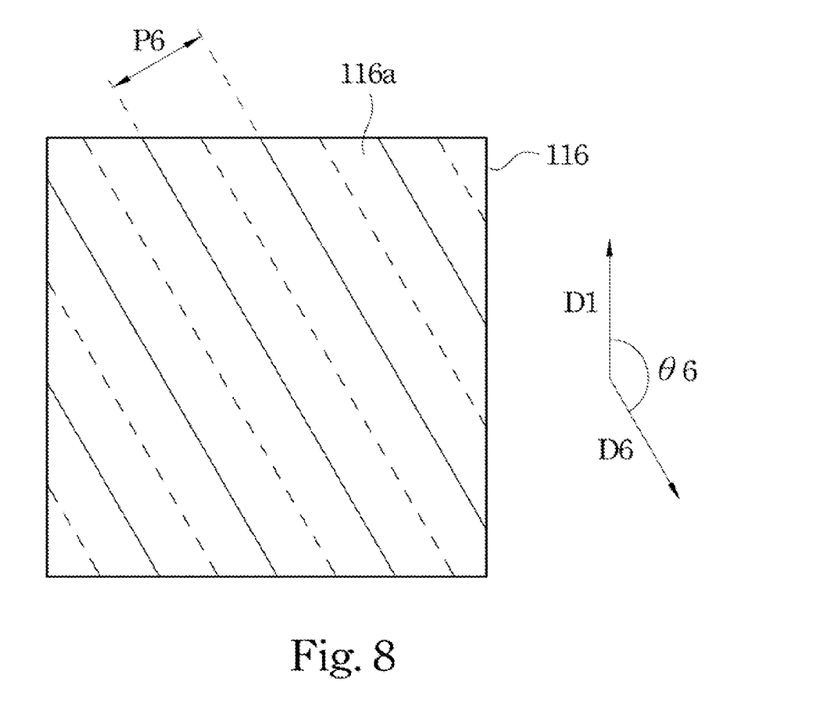
FIG. 8 is top view schematically illustrating a sixth grating according to one embodiment of the present disclosure.

In another embodiment, the first region 110 further includes a fifth grating 115 and a sixth grating 116. FIG. 7 and FIG. 8 are top views respectively illustrating the fifth grating 115 and the sixth grating 116. The fifth grating 115 has a plurality of prisms 115a extending in a fifth direction D5. The sixth grating 116 has a plurality of prisms 116a extending in a sixth direction D6. The included angle θ5 between the fifth direction D5 and the first direction D1 is about 115 degrees to about 125 degrees. The included angle θ6 between the sixth direction D6 and the first direction D1 is about 145 degrees to about 155 degrees. The prisms 115a of the fifth grating 115 are arrange by a fifth pitch P5. The prisms 116a of the sixth grating 116 are arrange by a sixth pitch P6. Both the fifth pitch P5 and the sixth pitch P6 are in the range of about 0.2 μm to about 22.3 μm. In one example, all the first pitch P1, the second pitch P2, the third pitch P3, the fourth pitch P4, the fifth pitch P5 and the sixth pitch P6 are of substantially equal length. In other embodiments, the first, second, third, fourth, fifth and sixth gratings 111, 112, 113, 114, 115, 116 may be diffraction gratings.

In one example, as depicted in FIG. 1, the first grating 111, the second grating 112 and the third grating 113 are substantially arranged in a row, whereas the fourth grating 114, the fifth grating 115 and the sixth grating 116 are substantially arranged in another raw. Furthermore, the right edge of the fourth grating 114 and the left side of the second grating 112 are arranged on a straight line L1. In other words, the right edge of the fourth grating 114 is aligned with the left side of the second grating 112. In addition, the right edge of the fifth grating 115 and the left side of the third grating 113 are arranged on another straight line L2. This arrangement of the gratings 111, 112, 113, 114, 115, 116 facilitates the cooperation between these gratings, and therefore the first region 110 may transmit light in a certain wavelength range and block light in another wavelength range. In one example, each of the gratings 111, 112, 113, 114, 115, 116 has an identical area. The area of each of the gratings 111, 112, 113, 114, 115, 116 may be about 4 μm² to about 4000 μm², for example.

In another embodiment, as depicted in FIG. 1, the light-emitting surface 102 of the light guide 100 may further include a second region 120 and a third region 130. The second region 120 has a plurality of gratings 120a spaced apart from each other by a spacing interval. Each of the gratings 120a of the second region 120 has a respective pre-determined direction and includes a plurality of prisms extending in the respective pre-determined direction. In the second region 120, a pre-determined direction of at least one grating 120a is different from a pre-determined direction of another grating 120a. The gratings 120a of the second region 120 cooperate together such that light within a second wavelength range may be transmitted through the gratings 120a of the second region 120, and light within another wavelength range maybe blocked. In addition, the third region 130 has a plurality of gratings 130a spaced apart from each other by a spacing interval. Each of the gratings 130a of the third region 130 has a respective pre-determined direction and includes a plurality of prisms extending in the respective pre-determined direction. In the third region 130, a pre-determined direction of at least one grating 130a is different from a pre-determined direction of another grating 130a. The gratings 130a of the third region 130 cooperate together to transmit light within a third wavelength range and to blocked light within another wavelength range. In this embodiment, the first wavelength range includes at least one wavelength between about 600 nm and about 680 nm, whereas said another wavelength range associated with the first region 110 includes at least one wavelength between about 500 nm and about 570 nm and at least one wavelength between about 400 nm and about 490 nm. Particularly, the first region 110 may transmit red light, but block green light and blue light. More particularly, the transmittance of the first region 110 to green light or blue light is less than the transmittance of the first region 110 to red light. The second wavelength range includes at least one wavelength between 500 nm to about 570 nm, whereas said another wavelength range associated with the second region 110 includes at least one wavelength between about 600 nm and about 680 nm and at least one wavelength between about 400 nm and about 490 nm. That is, the second region 120 may transmit green light, but block red light and blue light. The transmittance of the second region 120 to red light or blue light is less than the transmittance of the second region 120 to green light. The third wavelength range includes at least one wavelength between 400 nm to about 490 nm, whereas said another wavelength range associated with the third region 130 includes at least one wavelength between about 600 nm and about 680 nm and at least one wavelength between about 500 nm and about 570 nm. That is, the third region 130 may transmit blue light, but block red light and green light. The transmittance of the third region 130 to red light or green light is less than the transmittance of the second region 120 to blue light. Therefore, the first region 110, the second region 120 and the third region 130 may respectively exhibit a red color, a green color and a blue color by adjusting the crest angles of the prisms, the pitches of the prisms and the layout of the gratings in the first region 110, the second region 120 and the third region 130.

Figure 9:
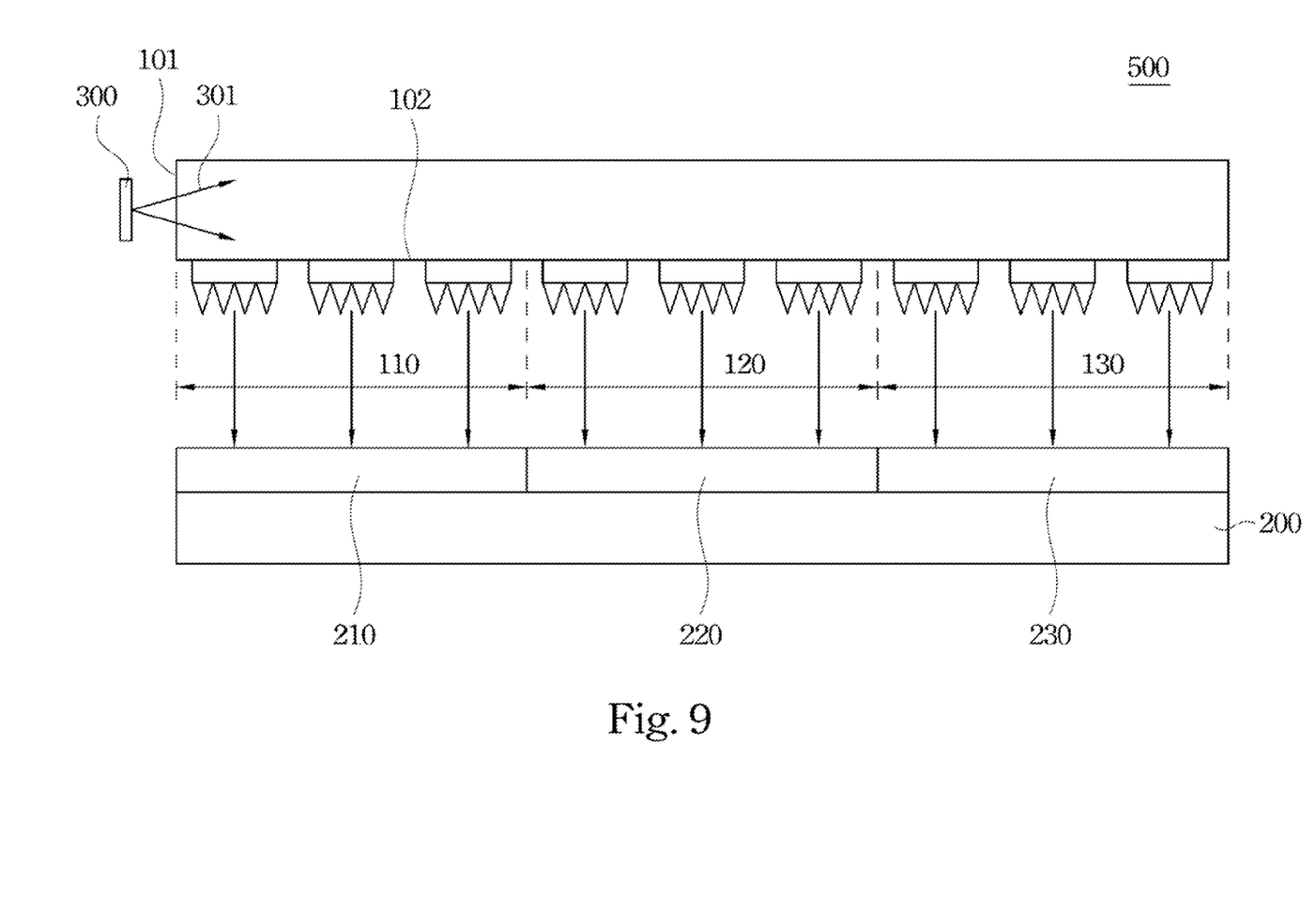
FIG. 9 is a cross-sectional view schematically illustrating an electrophoretic display apparatus switchable between a black-white mode and a color mode according to one embodiment of the present disclosure.

FIG. 9 is a cross-sectional view schematically illustrating an electrophoretic display apparatus 500, which is switchable between a black-white mode and a color mode, according to one embodiment of the present disclosure. The electrophoretic display apparatus 500 includes the light guide 100 of any example or embodiment described hereinbefore, an electrophoretic display panel 200 and a light source 300.

The light source 300 is configured to emit a light 301 into the light guide. The light 301 is transmitted into the light guide through the light-receiving surface 101 of the light guide. In one embodiment, the light source 300 includes a red light-emitting diode (LED), a green LED and a blue LED. The red LED may emit a light having a principal wavelength of about 600 nm to about 700 nm. The green LED may emit a light having a principal wavelength of about 500 nm to about 600 nm. The blue LED may emit a light having a principal wavelength of about 380 nm to about 480 nm. In another embodiment, light source 300 may be a laser capable of emitting a white light beam or a LED capable of emitting white light.

The light guide may be the light guide 100 of any example or embodiment described hereinbefore. In one embodiment, light-emitting surface 102 of the light guide includes a first region 110, a second region 120 and a third region 130. The first region 110 has a plurality of gratings spaced apart from each other by a spacing interval. The gratings of the first region 110 cooperate together to transmit light within a first wavelength range and to block light within another wavelength range. The second region 120 has a plurality of gratings spaced apart from each other by a spacing interval. The gratings of the second region 120 cooperate together to transmit light within a second wavelength range and to block light within another wavelength range. The third region 130 has a plurality of gratings spaced apart from each other by a spacing interval. The gratings of the third region 130 cooperate together to transmit light within a third wavelength range and to block light within another wavelength range. For example, the first region 110 substantially merely allows transmitting red light within the wavelength range of about 600 nm to about 680 nm, and the transmittance of the first region 110 to light of the other wavelengths is lower than the transmittance to red light. The second region 120 substantially merely allows transmitting green light within the wavelength range of about 500 nm to about 570 nm, and the transmittance of the second region 120 to light of the other wavelengths is lower than the transmittance to green light. The third region 130 substantially merely allows transmitting blue light within the wavelength range of about 400 nm to about 490 nm, and the transmittance of the third region 130 to light of the other wavelengths is lower than the transmittance to blue light.

The electrophoretic display panel 200 has a display area, which at least includes a first sub-pixel 210, a second sub-pixel 220 and a third sub-pixel 230. The first, second and third sub-pixels 210, 220, 230 respectively correspond to the first region 110, the second region 120 and the third region 130. The electrophoretic display panel 200 may be a microcup electrophoretic display panel or a microcapsule electrophoretic display panel. It is noted that the electrophoretic display panel 200 does not include conventional color filters having pigment or dye therein. Therefore, the electrophoretic display panel 200 exhibits merely a black color, a white color or a gray color. When the lights with certain colors emitted from the first, second and third regions 110, 120, 130 respectively project to the first, second and third sub-pixels 210, 220, 230, the incident lights are reflected by the white pigment particles in the first, second and third sub-pixels 210, 220, 230 such that originally colorless sub-pixels may exhibit colors. Therefore, the electrophoretic display apparatus according to the embodiments disclosed herein may exhibit color images, in which conventional color filters are no longer required. Significantly, when the light source 300 is turned on the electrophoretic display apparatus 100 may be operated in the color mode since the light emitted from the light source 300 travels the special structures formed on the light guide 100. On the other hand, when the light source 130 is turned off, the electrophoretic display apparatus 100 is operated in the black-white mode. Accordingly, the electrophoretic display apparatus 500 may be switchable between the black-white mode and the color mode.

According to the embodiments disclosed herein, the electrophoretic display apparatus may exhibit color images without providing color filters therein. Furthermore, the electrophoretic display apparatus may be switched from the black-white mode to the color mode or switched from the color mode to the black-white mode in the state of use.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A light guide, comprising:
a light-receiving surface for receiving an incident light; and
a light-emitting surface comprising:
a first region having a plurality of gratings spaced apart from each other by a spacing interval, each of the gratings of the first region having a respective pre-determined direction and including a plurality of prisms extending in said respective pre-determined direction, wherein a pre-determined direction of at least one of the gratings of the first region is different from a pre-determined direction of another one of the gratings of the first region, wherein the gratings of the first region cooperate to transmit a light having a wavelength in a first wavelength range, and to block a light having a wavelength in another wavelength range; wherein the gratings of the first region comprise:
a first grating having a plurality of prisms extending in a first direction;
a second grating having a plurality of prisms extending in a second direction that is substantially perpendicular to the first direction;
a third grating having a plurality of prisms extending in a third direction; and
a fourth grating having a plurality of prisms extending in a fourth direction, wherein an included angle between the third direction and the first direction is about 25 degrees to about 35 degrees, and an included angle between the fourth direction and the first direction is about 55 degrees to about 65 degrees; and
a second region having a plurality of gratings spaced apart from each other, and the gratings of the second region cooperating to transmit a light having a wavelength in a second wavelength range, and to block a light having a wavelength in the another wavelength range, wherein the second wavelength range is different from the first wavelength range;
wherein the gratings of the first region and the gratings of the second region are extended on substantially the same level.

2. The light guide according to claim 1, wherein the gratings of the first region further comprises:
a fifth grating having a plurality of prisms extending in a fifth direction; and
a sixth grating having a plurality of prisms extending in a sixth direction, wherein an included angle between the fifth direction and the first direction is about 115 degrees to about 125 degrees, and an included angle between the sixth direction and the first direction is about 145 degrees to about 155 degrees.

3. The light guide according to claim 2, wherein the first grating, the second grating and the third grating are substantially disposed in a row, whereas the fourth grating, the fifth grating and the sixth grating are substantially disposed in another row.

4. The light guide according to claim 2, wherein an edge of the fourth grating is substantially aligned with an edge of the second grating, and an edge of the fifth grating is substantially aligned with an edge of the third grating.

5. The light guide according to claim 2, wherein the prisms of the first grating are arranged by a first pitch, the prisms of the second grating are arranged by a second pitch, and the prisms of the third grating are arranged by a third pitch, wherein the first pitch substantially equals the third pitch, and the first pitch is greater than the second pitch.

6. The light guide according to claim 1, wherein all of the gratings of the first region are of substantially equal area.

7. The light guide according to claim 1, wherein the spacing interval is about 1 μm to about 15 μm.

8. The light guide according to claim 1, wherein the prisms of each of the gratings of the first region are arranged by a pitch of about 0.2 μm to about 22.3 μm.

9. The light guide according to claim 1, wherein the first wavelength range includes at least one wavelength between about 600 nm and about 680 nm, wherein the another wavelength range includes at least one wavelength between about 500 nm and about 570 nm or at least one wavelength between about 400 nm and about 490 nm.

10. The light guide according to claim 1, wherein the first wavelength range includes at least one wavelength between about 500 nm and about 570 nm, wherein the another wavelength range includes at least one wavelength between about 600 nm and about 680 nm and at least one wavelength between about 400 nm and about 490 nm.

11. The light guide according to claim 1, wherein the first wavelength range includes at least one wavelength between about 400 nm and about 490 nm, wherein the another wavelength range includes at least one wavelength between about 600 nm and about 680 nm or at least one wavelength between about 500 nm and about 570 nm.

12. The light guide according to claim 1, wherein the gratings of the second region are spaced apart from each other by a spacing interval, each of the gratings of the second region having a respective pre-determined direction and including a plurality of prisms extending in said respective pre-determined direction of the gratings of the second region, wherein the pre-determined direction of one of the gratings of the second region is different from the pre-determined direction of another one of the gratings of the second region.

13. The light guide according to claim 12, wherein the light-emitting surface further comprises a third region having a plurality of gratings spaced apart from each other by a spacing interval, each of the gratings of the third region having a respective pre-determined direction and including a plurality of prisms extending in said respective pre-determined direction of the gratings of the third region, wherein the pre-determined direction of one of the gratings of the third region is different from the pre-determined direction of another one of the gratings of the third region, wherein the gratings of the third region cooperate to transmit a light having a wavelength in a third wavelength range, and to block a light having a wavelength in another wavelength range.

14. An electrophoretic display apparatus switchable between a black-white mode and a color mode, the electrophoretic display apparatus comprising:
  an electrophoretic display panel having a first sub-pixel, a second sub-pixel and a third sub-pixel;
  a light source for emitting a light; and
  a light guide, comprising:
    a light-receiving surface for receiving the light emitted from the light source; and
    a light-emitting surface, comprising a first region, a second region and a third region, wherein
    the first region has a plurality of gratings spaced apart from each other by a spacing interval, wherein the gratings of the first region cooperate to transmit light having a wavelength in a first wavelength range, and to block light having a wavelength in another wavelength range,
    the second region has a plurality of gratings spaced apart from each other by a spacing interval, wherein the gratings of the second region cooperate to transmit light having a wavelength in a second wavelength range, and to block light having a wavelength in another wavelength range, and
    the third region has a plurality of gratings spaced apart from each other by a spacing interval, wherein the gratings of the third region cooperate to transmit light having a wavelength in a third wavelength range, and to block light having a wavelength in another wavelength range;
  wherein when the light source is turned on, the first, second and third regions respectively direct the light of the first, second and third wavelength ranges to the first, second and third sub-pixels such that the electrophoretic display apparatus is operated in the color mode, and when the light source is turned off, the electrophoretic display apparatus is operated in the black-white mode.

15. The electrophoretic display apparatus according 14, wherein each of the gratings of the first region has a respective pre-determined direction and includes a plurality of prisms extending in said respective pre-determined direction, wherein a pre-determined direction of at least one of the gratings of the first region is different from a pre-determined direction of another one of the gratings of the first region.

16. The electrophoretic display apparatus according to 14, wherein each of the gratings of the second region has a respective pre-determined direction and includes a plurality of prisms extending in said respective pre-determined direction, wherein a pre-determined direction of at least one of the gratings of the second region is different from a pre-determined direction of another one of the gratings of the second region.

17. The electrophoretic display apparatus according to 14, wherein each of the gratings of the third region has a respective pre-determined direction and includes a plurality of prisms extending in said respective pre-determined direction, wherein a pre-determined direction of at least one of the gratings of the third region is different from a pre-determined direction of another one of the gratings of the third region.

18. The electrophoretic display apparatus according to 14, wherein the first wavelength range includes at least one wavelength between about 600 nm and about 680 nm, the second wavelength range includes at least one wavelength between about 500 nm and about 570 nm, and the third wavelength range includes at least one wavelength between about 400 nm and about 490 nm.

* * * * *